United States Patent Office 3,551,365
Patented Dec. 29, 1970

3,551,365
COMPOSITE CROSS - LINKING AGENT/RESIN FORMER COMPOSITIONS AND COLD-SETTING AND HEAT - SETTING RESINS PREPARED THEREFROM
Ralph Matalon, 432 Cherry Hill Blvd., Cherry Hill, N.J. 08034
No Drawing. Continuation-in-part of application Ser. No. 736,984, June 14, 1968, which is a continuation-in-part of application Ser. No. 711,208, Mar. 7, 1968. This application Nov. 29, 1968, Ser. No. 780,293
Int. Cl. C08g 37/12, 37/14
U.S. Cl. 260—17.2
27 Claims

ABSTRACT OF THE DISCLOSURE

There are disclosed herein composite cross-linking agent/resin-former compositions comprising a reducing sugar, water, a polyhydric phenol having at least two hydroxy groups in the meta position and phosphoric acid, as well as cold-setting and heat-setting, flameproof and fireproof, resinous binders comprising the reaction product of the composite cross-linking agent/resin-former composition with either furfuryl alcohol or a furfuryl alcohol-formaldehyde resin. The cold-setting and heat-setting, flameproof and fireproof, resinous binder can be blended with foundry sands to form cores and molds.

---

This application is a continuation-in-part of United States application Ser. No. 736,984, filed June 14, 1968, which in turn is a continuation-in part of United States application Ser. No. 711,208, filed Mar. 7, 1968, now both abandoned.

The present invention relates to composite cross-linking agent/resin-former compositions as well as binders and foundry sand mixtures formed therefrom.

The composite cross-linking agent/resin-former composition of the invention comprises a three- or four-component liquid solution. One component thereof is a reducing sugar. Representative examples of the reducing sugars include monosaccharides and disaccharides, such as dextrose and commercial glucose produced by hydrolysis of carbohydrates, fructose, galactose, mannose, levulose, lactose, maltose, and the like, and their blends with higher saccharides such as found in corn syrup, with dextrose being preferred. The amount of reducing sugar which is utilized generaly lies in the range of from about 25% to about 80% by weight of the composition. The second component of the composition is water which is generally present therein in an amount of from about 4% to about 20% by weight thereof. The third component part of the composition is a polyhydric phenol having at least two hydroxy groups in a meta position, namely, resorcinol, pyrogallol and phloroglucinol (preferably resorcinol), which is utilized in an amount generally in the range of from about 0% to about 15% by weight thereof or higher. For the purposes of this invention the maximum amount of polyhydric phenol is not critical, but rather is determined primarily by price considerations. The fourth and remaining component is phosphoric acid of 85% strength which is present in the composition generally in an amount of from about 8% to about 62% by weight thereof. Should lower strength phosphoric acid be used, this should be compensated by a reduction of the free water present in the finished composite cross-linking agent/resin-former.

Those composite cross-linking agent/resin-former compositions (Group I) useful in the production of cold-setting, i.e., at ambient temperatures, resinous binders comprise from about 25% to about 50% by weight of the reducing sugar, from about 4% to about 20% by weight of water, from about 3% to about 15% by weight of the polyhydric phenol and from about 20% to about 62% by weight of 85% strength phosphoric acid.

On the other hand, those composite cross-linking agent/resin-former compositions (Group II) useful in the production of heat-setting, i.e., with the external application of heat, resinous binder compositions comprise from about 50% to about 80% by weight of the reducing sugar, from about 4% to about 20% by weight of water, from about 0% to about 15% by weight of the polyhydric phenol and from about 8% to about 31% by weight of 85% strength phosphoric acid.

Typical preferred examples of such composite cross-linking agent and resin-former compositions (Group I) for the preparation of cold-setting resinous binders are given in the following table.

TABLE I

| Components | Percent by weight | | | | | | |
|---|---|---|---|---|---|---|---|
| Reducing sugar, e.g., dextrose or commercial glucose | 49 | 46 | 42 | 44 | 31.5 | 25 | 49 |
| Water | 11 | 8 | 11 | 8 | 6 | 4 | 5 |
| Polyhydric phenol, e.g., resorcinol | 7 | 10 | 7 | 8 | 10.5 | 9 | 7 |
| Phosphoric acid (85%) | 33 | 36 | 40 | 40 | 52 | 62 | 33 |
| Methanol | | | | | | | 6 |

Typical preferred examples of such composite cross-linking agent and resin-former compositions (Group II) for the preparation of heat-setting resinous binders are given in the following table.

TABLE II

| Components | Percent by weight | | | | | | |
|---|---|---|---|---|---|---|---|
| Reducing sugar, e.g., dextrose or commercial glucose | 65 | 69 | 69 | 68 | 72 | 77.5 | 65 |
| Water | 7 | 7 | 7 | 8 | 9 | 9.7 | 5 |
| Polyhydric phenol, e.g., resorcinol | 7 | 4 | 5 | 8 | 7 | | 7 |
| Phosphoric acid (85%) | 21 | 20 | 19 | 16 | 12 | 12.8 | 21 |
| Methanol | | | | | | | 2 |

These compositions may be prepared by dissolving the reducing sugar in water. When the solution is obtained, the polyhydric phenol, when used, is then added while stirring and this is followed by the addition of part or all of the phosphoric acid. The system is brought to the boil and maintained at about 115–116° C. for a period of five to ten minutes or longer after which it is cooled to ambient temperatures with the further addition of any balance of the phosphoric acid. The system can be maintained at a higher temperature as the initial water content is reduced.

The composite cross-linking agent/resin-former compositions described above are utilized in the preparation of cold-setting or heat-setting, flame-proof and fire-proof, resinous binders by mixing at ambient temperature at least about 1 or more parts by weight thereof with about 1 part by weight of either furfuryl alcohol or a blend or polymer of 95% to 85% by weight of furfuryl alcohol plus 5% to 15% by weight respectively of formaldehyde or other aldehydes, such as glyoxal or furfural. Typical weight ratios of the seven composite cross-linking agent/resin-former compositions given in Table I above to furfuryl alcohol or to furfuryl alcohol-formaldehyde blends and polymers may be respectively 1–26:1, 1–10:1, 1–6:1, 1–10:1, 2–5:1, 2–5:1 and 1–26:1. Typical weight ratios of the seven composite cross-linking agent/resin-former compositions given in Table II above to furfuryl alcohol or to furfuryl alcohol-formaldehyde blends or polymers may generally be 1–10:1. Thus as the phosphoric acid content of the composite cross-linker/resin-former increases, a lower amount of the cross-linker/resin-former may be employed in preparing the resinous binders. Also as the resorcinol content increases, a higher amount of the cross-linker/resin-former may be employed in preparing the resinous binders.

Upon mixing the composite cross-linking agent/resin-former compositions of Group I with the furfuryl alcohol or the furfuryl alcohol-formaldehyde blend or polymer, a reaction sets in upon contact and the viscous reaction product gradually increases in its consistency, becomes elastic, then rubbery, and finally sets to a solid. In regard to the first formulation in the above Table I, this solid is elastic for longer periods as the weight ratio of the composite cross-linking agent/resin-former to furfuryl alcohol increases above the ratio 5:1. A rubbery mass is obtained at a ratio of 8:1 which eventually becomes very hard. However, at ratios of 13:1 and 26:1, the reaction product is almost permanently elastic. All these resinous reaction products are non-flammable and do not flow when heated. They are therefore cold-set and also thermoset. These resins do not swell when flamed. However, the 26:1 ratio reaction product has a tendency to expand when flamed with the production of lustrous carbon.

The polyhydric phenol content of the cross-linking agent/resin former is fundamental in determining the nature of the reaction product obtained upon mixing it with furfuryl alcohol or furfuryl alcohol-formaldehyde blend or polymer. For instance, when the reaction is made at the ratio of 3:1 using the third formulation in Table I above, a very hard solid is obtained; when the polyhydric phenol (resorcinol) in the third formulation in Table I above is reduced to 4.85%, a solid is again obtained. However, a rubbery long liquid is obtained when the polyhydric phenol (resorcinol) is reduced to 2.44% and when the polyhydric phenol is omitted, the reaction product is fluid and hence not cold-set.

Further, if we examine the properties of the reaction product obtained from the sixth formulation in Table I above as compared with the reaction product obtained from the sixth formulation modified so as to be free from polyhydric phenol (resorcinol), we find that at the 2:1, 4:1 and 6:1 ratio with furfuryl alcohol noncontinuous sets are obtained with the polyhydric phenol-free system, a soft jelly at 2:1, a pasty liquid at 4:1, a granular liquid at 6:1, whereas with the polyhydric phenol (resorcinol)-containing system we obtain a very hard mass at 2:1 and 4:1 and a rubber-gum at 6:1. These results demonstrate clearly that the reaction products of the resin formers of this invention should not be confused with the reaction products of furfuryl alcohol and phosphoric acid.

Unlike the conventional thermoset resins, the resins produced by this invention are resilient and withstand shock treatment without being shattered. They can be sawed, drilled and nailed, whereas the urea-formaldehyde and furfuryl alcohol thermoset polymers shatter when a nail is driven through them. The combination of the cold-setting feature, the elasticity and the high temperature stability, are an ideal set of properties and prerequisite in foundry application with sand cores and molds. One very important feature of these binders is the absence of nitrogen therein such as is present in the urea-type resins, which nitrogen content has been recognized in many cases to be responsible for the gassing of metal castings made of nodular iron and steels.

As the ratio of the composite cross-linking agent/resin-former to the furfuryl alcohol or to the furfuryl alcohol-formaldehyde blend or polymer increases, the temperature rise observed during cold setting decreases as the ratio increases. Because of the relatively low exothermicity observed in this reaction, it becomes possible, contrary to the situation existing with the furan resin-phosphoric acid catalyst system, to mix the composite cross-linking agent/resin-former with the furfuryl alcohol or the furfuryl alcohol-formaldehyde and pour the mix into cold molds with the reaction product setting into these molds with a perfect definition of the surface. There is no expansion, no bubbling, and a cold molded object is obtained which is free from bubbles. It also becomes possible in many cases to form the reaction product or binder in situ in the sand in one operation, thus simplifying the problem of control in foundry operations and reducing fluctuations in the ratio of the components.

Whereas the composite cross-linking agent/resin-former compositions of Group I react in a few minutes when contacted with furfuryl alcohol at room temperature, the composite cross-linking agent/resin-former compositions of Group II characterized by low phosphoric acid or polyhydric phenol content give blends with furfuryl alcohol and with furfuryl alcohol-formaldehyde blends or polymers which remain fluid for one or several hours while they set readily in seconds or minutes under heat to give resinous binders. Such blends are ideal for heat setting applications on asbestos, particle board, textiles, graphite, foundry sands (silica, chromite and olivine) coated with the products of the invention. The fluidity of these blends, and their working life, may be increased by incorporating fluidifiers, such as water and/or methanol, present in an amount of the order of 7–15% on the cross-linker/resin former. Water additions delay set at elevated temperatures whereas methanol additions prolong life at room temperature while set at high temperature is maintained at a fast rate. The retarding effect of the methanol observed in Group II compositions may also be used in Group I compositions to fluidify these compositions as a result of the methanol replacing the fluidifying effect of the water and also to increase the life thus permitting the use of Group I compositions in heat setting applications. The physical properties of the cured heat-set binders may be varied by changing the ratio of the components thereof. Thus, high sugar and low furfuryl alcohol content produce a plasticized binder, whereas hard and brittle heat-set binders are obtained at high phosphoric acid and low sugar content. Increasing amounts of resorcinol permit the setting of sands at lower heat while at the same time it becomes possible to increase the composite cross-linking agent/resin former content of the binder while maintaining rigidity. For instance, in the absence of resorcinol it is just about possible to prepare using Example 6 of Table II a binder containing only 50% of the composite cross-linking agent/resin former, whereas at 7% resorcinol one may prepare binders with 80% of the composite cross-linking agent/resin former which is harder while at the same time it also sets at a lower heat.

The cold-set and heat-set reaction products are very strong adhesives to metal, glass, and carbon, and are particularly valuable in the formation of aggregates such as in the manufacture of foundry cores and molds. In these applications from about 1% to about 5% by weight of the binder is required for from about 99% to about 95% by weight of the foundry sand. This sand is generally silica sand but it is possible to apply the binder with equally effective results to zircon sands and chromite sands, and even to olivine sands using the fifth formulation of Table I at the ratio of 3:1 to furfuryl alcohol. Because of the continuity in the reaction between the composite cross-linker/resin former and the furfuryl alcohol or the furfuryl alcohol-formaldehyde blend or resin and because of the absence of syneresis, the continuous gelation obtained in the reaction product or binder permits the production of foundry cores and molds without any sticking to the boxes and with set up times of the order of 30 minutes or less thus speeding production considerably. Also, since the binders are relatively poor in organic solvents, they do not affect the coatings of the core boxes which have been dissolved by furan resins. Furthermore, the cores and the molds, when set, can be in a rubbery state which allows stripping from the boxes without danger of breakage of the core. This danger exists when a core is too rigid under stripping conditions. After stripping, the core hardens in air and becomes fully rigid. Light alloys, aluminum, bronze, gray irons and steels can be cast using these cores and molds produced with the above binder.

During casting there are no unpleasant odor, flaming or gassing of the metal. One unique feature of the above resin binder is the very low volume of gas evolved by comparison with the previously known resin binders. In comparative testing at 1800° F. following the standard AFS testing procedure, the volume of gas evolved was appreciably less than that observed with a commercially available furan resin binder or phenolic-modified furan resins. In most cases it is on the order of 50% or less only of the gas observed with the best available furan resin binders.

The above resin binders have given excellent metal finish in castings of very intricate designs. The surface of the casting can be obtained generally without the application of a mold wash on the core to fill in the spaces between the sand grains. It is as if the binder was providing bridging between the sand grains at high temperature.

Brass and aluminum have been cast at 2100° F. and 1350° F. respectively to excellent finishes using a refractory sand mixture containing 1500 parts of silica sand (68 AFS fineness), 23 parts of the third composite cross-linker/resin-former composition shown in Table I above, and 11.5 parts of a furfuryl alcohol-formaldehyde polymer. Gray iron has been cast at 2500° F. on a cold-set refractory sand mixture composed of 1000 parts silica (55 AFS fineness), 18 parts of the first composite cross-linker resin former composition of Table I above and 6 parts of a furfuryl alcohol-formaldehyde polymer. The casting exhibits good metal finish with no porosity. Low carbon steel has been cast at 2920° F. on a cylindrical core 2" high and 2" in diameter prepared with lake sand from Michigan, 2.25% of the second formulation of Table I above and 0.75% furfuryl alcohol, the core being fully enclosed by 2 inches of steel on all sides except the base. Good finish was obtained and the X-ray of the casting is fully sound with no gas penetration in spite of the severity of these test conditions imposing intense heat on a small size core with only one outlet through the base of the core for the gases evolved. Similarly castings made on heat-set cores using 3% binder composed of the blend of Example 1 of Table II with furfuryl alcohol at the ratio 4:1 and 9:1 gave sound castings on the low carbon steel without gasing of the metal. The furfuryl alcohol-formaldehyde polymer could be varied within wide limits. However, according to this invention, it is preferred to use as little formaldehyde as possible with respect to the furfuryl alcohol so that no unpleasant formaldehyde odor is evolved in core and mold making or when the metal is poured on the sand. Because of the particular composition of the new binders, e.g., at 3:1 and 4:1, which is predominant in the cross-linking agent/resin former, it becomes possible to use some urea in the furfuryl alcohol-formaldehyde polymer or blend without impairing the soundness of the casting.

Various additives, such as graphite, pitch, olivine flour, boric acid, iron oxide and other conventional foundry additives, may be used in the sand-resinous binder mix to improve the quality of the cores and molds or the finish on the casting made therein.

The resin-former/cross-linker is polymeric and is the result of reactions and the bonding of reducing sugar with the phosphoric acid and with the polyhydric phenol, when this component is present in the composition. The extent of the polymerization of the resin-former/cross-linker is indicated by the viscosity and this viscosity rises when the cooking temperature and/or duration of the cooking rises. The resin-former/cross-linker reacts and is hardened by furfuryl alcohol and aldehydes and by the blend or polymer of these two reactants. While the percent of phosphoric acid present in the composition of the resin-former/cross-linker determines whether complete resinification, i.e., conversion to a solid binder, will occur at ambient or elevated temperature, the presence of the reacted polyhydric phenol as an intimate part of the resin-former/cross-linker structure is essential for the rapid development of the rigidity, of the resinified binder at room and at elevated temperatures. The water, in the resin-former/cross-linker performs the function of a fluidifier and as such may be replaced in great part by methanol or other polar volatile solvents which confer fluidity while maintaining a high rate of conversion to the solid binder at the elevated temperatures. The resin-former/cross-linker flame-proofing properties upon reaction with the furfuryl alcohol decrease as we move fom Group I to Group II.

What is claimed is:

1. A composite cross-linking agent/resin former composition consisting essentially of the liquid polymeric produce of a heated blend of from about 25% to about 80% by weight of a reducing sugar, from about 4% to about 20% by weight of water, from about 0% to about 15% by weight of a polyhydric phenol having at least two hydroxy groups in a meta position selected from the class consisting of resorcinol, pyrogallol and phloroglucinol, and from about 8% to about 62% by weight of 85% strength phosphoric acid.

2. A composite cross-linking agent/resin former composition particularly useful in the preparation of cold-setting resinous binders consisting essentially of the liquid polymeric product of a heated blend of from about 25% to about 50% by weight of a reducing sugar, from about 4% to about 20% by weight of water, from about 3% to about 15% by weight of a polyhydric phenol having at least two hydroxy groups in a meta position selected from the class consisting of resorcinol, pyrogallol and phloroglucinol, and from about 20% to about 62% by weight of 85% strength phosphoric acid.

3. A composite cross-linking agent/resin former composition particularly useful in the preparation of heat-setting resinous binders consisting essentially of the liquid polymeric product of a heated blend of from about 50% to about 80% by weight of a reducing sugar, from about 4% to about 20% by weight of water from about 0% to about 15% by weight of a polyhydric phenol having at least two hydroxy groups in a meta position selected from the class consisting of resorcinol, pyrogallol and phloroglucinol, and from about 8% to about 31% by weight of 85% strength phosphoric acid.

4. The composition as defined by claim 2 wherein the components are present in the following amounts: About 42% by weight of a reducing sugar selected from the group consisting of dextrose and commercial glucose, about 11% by weight of water, about 7% by weight of resorcinol and about 40% by weight of 85% strength phosphoric acid.

5. The composition as defined by claim 2 wherein the components are present in the following amounts: About 25% by weight of a reducing sugar selected from the group consisting of dextrose and commercial glucose, about 4% by weight of water, about 9% by weight of resorcinol and about 62% by weight of 85% strength phosphoric acid.

6. The composition as defined by claim 2 wherein the components are present in the following amounts: About 49% by weight of a reducing sugar selected from the group consisting of dextrose and commercial glucose, about 11% by weight of water, about 7% by weight of resorcinol and about 33% by weight of 85% strength phosphoric acid.

7. The composition as defined by claim 2 wherein the components are present in the following amounts: About 44% by weight of a reducing sugar selected from the group consisting of dextrose and commercial glucose, about 8% by weight of water, about 8% by weight of resorcinol and about 40% by weight of 85% strength phosphoric acid.

8. The composition as defined by claim 2 wherein the components are present in the following amounts: About 46% by weight of a reducing sugar selected from the group consisting of dextrose and commercial glucose, about 8% by weight of water, about 10% by weight of resorcinol and about 36% by weight of 85% strength phosphoric acid.

9. The composition as defined by claim 2 wherein the components are present in the following amounts: About 31.5% by weight of a reducing sugar selected from the group consisting of dextrose and commercial glucose, about 6% by weight of water, about 10.5% by weight of resorcinol and about 52% by weight of 85% strength phosphoric acid.

10. The composition as defined by claim 3 wherein the components are present in the following amounts: About 65% by weight of a reducing sugar selected from the group consisting of dextrose and commercial glucose, about 7% by weight of water, about 7% by weight of resorcinol and about 21% by weight of 85% strength phosphoric acid.

11. The composition as defined by claim 3 wherein the components are present in the following amounts: About 69% by weight of a reducing sugar selected from the group consisting of dextrose and commercial glucose, about 7% by weight of water, about 4% by weight of resorcinol and about 20% by weight of 85% strength phosphoric acid.

12. The composition as defined by claim 3 wherein the components are present in the following amounts: About 69% by weight of a reducing sugar selected from the group consisting of dextrose and commercial glucose, about 7% by weight of water, about 5% by weight of resorcinol and about 19% by weight of 85% strength phosphoric acid.

13. The composition as defined by claim 3 wherein the components are present in the following amounts: About 72% by weight of a reducing sugar selected from the group consisting of dextrose and commercial glucose, about 9% by weight of water, about 7% by weight of resorcinol and about 12% by weight of 85% strength phosphoric acid.

14. The composition as defined by claim 3 wherein the components are present in the following amounts: about 68% by weight of a reducing sugar selected from the group consisting of dextrose and commercial glucose, about 8% by weight of water, about 8% weight of water, about 8% by weight of resorcinol and about 16% by weight of 85 strength phosphoric acid.

15. A resinous binder consisting essentially of the reaction product of at least about 1 part by weight of the composition defined by claim 1 and about 1 part by weight of furfuryl alcohol.

16. A cold-setting, resinous binder consisting essentially of the reaction product of at least about 1 part by weight of the composition defined by claim 2 and about 1 part by weight of furfuryl alcohol.

17. A heat-setting, resinous binder consisting essentially of the reaction product of at least about 1 part by weight of the composition defined by claim 3 and about 1 part by weight of furfuryl alcohol.

18. A cold-setting, resinous binder consisting essentially of the reaction product of from about 1 to about 6 parts by weight of the composition defined by claim 4 and about 1 part by weight of furfuryl alcohol.

19. A cold-setting, resinous binder consisting essentially of the reaction product of from about 2 to about 5 parts by weight of the composition defined by claim 5 and about 1 part by weight of furfuryl alcohol.

20. A cold-setting, resinous binder consisting essentially of the reaction product of from about 1 to about 26 parts by weight of the composition defined by claim 6 and about 1 part by weight of furfuryl alcohol.

21. A cold-setting, resinous binder consisting essentially of the reaction product of from about 1 part to about 10 parts by weight of the composition defined by claim 7 and about 1 part by weight of furfuryl alcohol.

22. A heat-setting, resinous binder consisting essentially of the reaction product of from about 1 part to about 10 parts by weight of the composition defined by claim 3 and about 1 part by weight of furfuryl alcohol.

23. A refractory sand mixture suitable for the casting of metals consisting essentially of from about 1% to about 5% by weight of the resinous binder defined by claim 15 and from about 99% to about 95% by weight respectively of a foundry sand.

24. A refractory sand mixture suitable for the casting of metals consisting essentially of from about 1% to about 5% by weight of the cold-setting resinous binder defined by claim 16 and from about 99% to about 95% by weight respectively of a foundry sand.

25. A refractory sand mixture suitable for the casting of metals consisting essentially of from about 1% to about 5% by weight of the heat-setting resinous binder defined by claim 17 and from about 99% to about 95% by weight respectively of a foundry sand.

26. The composition as defined by claim 1 which further contains from about 7% to about 15% by weight of methanol.

27. The composition as defined by claim 1 wherein part of the water is replaced by at least an equal part by weight of methanol.

References Cited

UNITED STATES PATENTS

| | | | |
|---|---|---|---|
| 2,892,227 | 6/1959 | Operhall | 260 |
| 3,182,030 | 5/1965 | Parkes | 260—17.3 |
| 3,203,057 | 8/1965 | Hunt et al. | 106—38.3 |
| 3,285,756 | 11/1966 | Moren | 106—217 |
| 3,360,492 | 12/1967 | Tsou | 260—17.3 |
| 3,399,067 | 8/1968 | Scott | 106—38.3 |
| 1,531,871 | 3/1925 | Nagel | 106—38.5 |
| 1,801,052 | 4/1931 | Meigs | 260—17.3 |
| 2,875,073 | 2/1959 | Gogek | 106—38.5 |

FOREIGN PATENTS

| | | | |
|---|---|---|---|
| 770,561 | 3/1957 | Great Britain | 106—38.5 |

WILLIAM SHORT, Primary Examiner

E. WOODBERRY, Assistant Examiner

U.S. Cl. X.R.

106—38.5, 162; 117—124, 132; 260—37, 38

PO-1050
(5/69)

UNITED STATES PATENT OFFICE
CERTIFICATE OF CORRECTION

Patent No. 3,551,365      Dated December 29, 1970

Inventor(s) Ralph Matalon

It is certified that error appears in the above-identified patent and that said Letters Patent are hereby corrected as shown below:

Column 2, line 33, the figure "7277.5" should read as two separate figures, i.e., -- 72    77.5 --. Column 6, line 3, after the word "rigidity" delete the comma (,). Column 7, line 45, delete "about 8% weight of water,"; line 47, delete "85" and insert -- 85% --.

Signed and sealed this 13th day of June 1972.

(SEAL)
Attest:

EDWARD M. FLETCHER, JR.
Attesting Officer

ROBERT GOTTSCHALK
Commissioner of Patents